(12) United States Patent
Winter (10) Patent No.: US 8,335,404 B2
(45) Date of Patent: Dec. 18, 2012

(54) DYNAMICALLY VARYING CLASSIFIED IMAGE DISPLAY SYSTEM

(76) Inventor: Vision Louis Winter, Los Angeles, CA (US)

( * ) Notice: Subject to any disclaimer, the term of this patent is extended or adjusted under 35 U.S.C. 154(b) by 1182 days.

(21) Appl. No.: 12/176,033

(22) Filed: Jul. 18, 2008

(65) Prior Publication Data

US 2009/0022373 A1 Jan. 22, 2009

Related U.S. Application Data

(60) Provisional application No. 60/951,158, filed on Jul. 20, 2007.

(51) Int. Cl.
*G06K 9/60* (2006.01)
*G06K 9/62* (2006.01)
*G09G 5/00* (2006.01)

(52) U.S. Cl. ........ 382/305; 382/224; 382/164; 382/159; 382/165; 345/1.2

(58) Field of Classification Search .................. 382/115, 382/118, 162–164, 159, 173, 190, 209, 236, 382/262, 224, 305; 375/240.08; 345/1.2, 345/E05.128

See application file for complete search history.

(56) References Cited

U.S. PATENT DOCUMENTS

| | | | | |
|---|---|---|---|---|
| 6,122,344 A * | 9/2000 | Beevor | ............................. | 378/88 |
| 6,356,646 B1 * | 3/2002 | Spencer | ........................ | 382/103 |
| 6,466,211 B1 * | 10/2002 | Havre et al. | .................... | 345/440 |
| 7,019,871 B2 * | 3/2006 | Risheq | ............................ | 358/474 |
| 7,076,088 B2 * | 7/2006 | Pavlidis | ........................ | 382/118 |
| 7,107,346 B2 * | 9/2006 | Boyd | ............................ | 709/227 |
| 7,174,029 B2 * | 2/2007 | Agostinelli et al. | .......... | 382/100 |
| 7,174,201 B2 * | 2/2007 | Govari et al. | .................. | 600/424 |
| 7,308,650 B2 * | 12/2007 | Yamakado et al. | ............ | 715/243 |
| 7,395,088 B2 * | 7/2008 | Shinzaki | .................... | 455/556.1 |
| 7,400,783 B2 * | 7/2008 | Sheu | .......................... | 382/294 |
| 7,800,646 B2 * | 9/2010 | Martin | .......................... | 348/157 |
| 7,876,352 B2 * | 1/2011 | Martin | .......................... | 348/157 |
| 7,983,387 B1 * | 7/2011 | Toh et al. | ........................ | 378/57 |
| 2004/0234109 A1 * | 11/2004 | Lemelson et al. | ............. | 382/118 |
| 2005/0034147 A1 * | 2/2005 | Best et al. | ....................... | 725/10 |
| 2005/0080671 A1 * | 4/2005 | Giraud et al. | .................... | 705/14 |
| 2005/0091599 A1 * | 4/2005 | Yamakado et al. | ............ | 715/732 |
| 2005/0157946 A1 * | 7/2005 | Sheu | ............................. | 382/294 |
| 2006/0139334 A1 * | 6/2006 | Van Delden et al. | ......... | 345/173 |
| 2006/0251324 A1 * | 11/2006 | Bachmann et al. | ............ | 382/173 |
| 2007/0016486 A1 * | 1/2007 | Stone et al. | ..................... | 705/26 |
| 2007/0033206 A1 * | 2/2007 | Laugier et al. | ................. | 707/100 |
| 2007/0057874 A1 * | 3/2007 | Le Roy et al. | ................. | 345/76 |
| 2007/0150916 A1 * | 6/2007 | Begole et al. | ................... | 725/10 |
| 2008/0008349 A1 * | 1/2008 | Binnig et al. | ................. | 382/100 |
| 2008/0037825 A1 * | 2/2008 | Lofgren et al. | ............... | 382/100 |
| 2008/0143890 A1 * | 6/2008 | Rosencwaig et al. | ......... | 348/836 |

(Continued)

OTHER PUBLICATIONS

Arnavut et al. "Lexical Permutation Sorting Algorithm" The Computer Journal Oct. 1997, pp. 1-4.*

(Continued)

*Primary Examiner* — David Zarka
*Assistant Examiner* — Mia M Thomas
(74) *Attorney, Agent, or Firm* — Gentle Winter; Courage Winter (57) ABSTRACT

A dynamically varying image display system including an electromagnetic radiation emitting display, a thematic based sorting algorithm processor, and a display processor. The electromagnetic radiation display is configured to sequentially display a plurality of thematically classified images and the thematic based sorting algorithm processor relies on various recognition systems.

15 Claims, 8 Drawing Sheets

U.S. PATENT DOCUMENTS

| | | | |
|---|---|---|---|
| 2008/0165081 A1* | 7/2008 | Lawther et al. | 345/1.2 |
| 2008/0253523 A1* | 10/2008 | Boyden et al. | 378/87 |
| 2008/0253627 A1* | 10/2008 | Boyden et al. | 382/128 |
| 2008/0253637 A1* | 10/2008 | Boyden et al. | 382/131 |
| 2009/0034805 A1* | 2/2009 | Perlmutter et al. | 382/118 |
| 2009/0040356 A1* | 2/2009 | Shih et al. | 348/333.01 |
| 2009/0295760 A1* | 12/2009 | Linge et al. | 345/179 |
| 2010/0231687 A1* | 9/2010 | Amory et al. | 348/36 |
| 2010/0310158 A1* | 12/2010 | Fu et al. | 382/159 |
| 2011/0085710 A1* | 4/2011 | Perlmutter et al. | 382/118 |
| 2011/0128372 A1* | 6/2011 | Malecki et al. | 348/135 |
| 2012/0027293 A1* | 2/2012 | Cok | 382/164 |
| 2012/0027303 A1* | 2/2012 | Cok | 382/190 |
| 2012/0027311 A1* | 2/2012 | Cok | 382/224 |
| 2012/0030575 A1* | 2/2012 | Cok | 715/738 |

OTHER PUBLICATIONS

Friendly, Michael. "Milestones in the history of thematic cartography, statistical graphics, and data visualization" Aug. 2009, pp. 1-79.*

* cited by examiner

DYNAMICALLY VARYING CLASSIFIED IMAGE DISPLAY SYSTEM

The present application claims priority under 35 U.S.C. Section 119(e) to U.S. Provisional Application Ser. No. 60/951,158, filed Jul. 20, 2007, the disclosure of which is expressly incorporated by reference in its entirety.

BACKGROUND

In the past image display apparatus have allowed users to view images but the images are viewed in a random sequence. In come cases the image sequence includes images that are not desirable to have included, for instance work photos, or are otherwise better not part of a slide show. Existing systems let users display images but the images ate randomly selected, or are displayed in sequence. Oftentimes neither option is the preferred manner of displaying the images. Therefore, it is desirable for there to be a system that would classify images and allow users to view images based on classification. Further, it would be desirable to have a display which would allow a user to remove an image from a slide show with the press of a button, or to display a slide show which has been adjusted to be appropriate for a specific audience.

SUMMARY

One embodiment of the present invention includes a dynamically varying image display system. The system includes an electromagnetic radiation emitting display, an outer perimeter frame having a first shape. The shape can be square, rectangular, circular, oval or virtually any other shape including shapes having properties of common to squares, rectangles, circles and ovals. It is to be noted that although many of the images may be substantially rectangular the display can take virtually any shape including a star, a fish, a car, etc. Of course in many cases the shape will be selected to optimally show an image. Thus, a star shaped frame may emphasize a central viewing portion while adding triangles to the peripheral. One embodiment of the present invention further includes at least one user interface. It is contemplated that this can take the form of a number of radio buttons, a touch screen, or, in some cases, other specific systems. It is contemplated that the system would not generally include a conventional integral keypad. One embodiment of the present invention further includes at least one system interface. The type of interface may include a wire interface such as a universal serial bus (USB) interface, a wireless interface, or other data transmission system. In some embodiments a thematic based sorting algorithm processor is a central component. A power source is contemplated, the exact form that the power supply might take is not critical for certain embodiments for the invention to perform. A battery, solar, and external power supply, or any combination of the foregoing is specifically contemplated. In another embodiment a support element is contemplated. The support element can take multiple forms, from a "stand" to a hole.

The present invention will generally take a rectangular form (where rectangular is understood to include a perfect rectangle (aka a square). The system has a depth, width, and height. In one embodiment the relationship between the width and height of the system substantially follows the Fibonacci series. Further, the ratio of the product of the height and width is at least an order of magnitude larger than depth. In another embodiment the thematic based sorting algorithm processor relies on at least one of object recognition, facial recognition, color recognition, color distribution, user added metadata, image capture device added metadata, and database added metadata. In another embodiment the thematic based sorting algorithm creates an image display sequence.

In another embodiment the system includes a motion sensor. The motion sensor can take many forms, relevant is that it be able to sense the motion of a person in the presence of the system. The sensor may also include a weight sensor so that a user sitting in a seat or weight applied to an anti-static chair mat. In another embodiment the sensor, whatever form it takes, is operationally interfaced with a system activation component. This has the effect of shutting at least a portion of the system down when the user is no longer present. This feature would be especially desirable in a battery powered embodiment where energy savings are especially desirable. In one embodiment the system can operate on battery or an external power source. In this case, the motion sensor might be disabled or the energy saving protocols might, less aggressively, be pursued. In another embodiment the motion sensor, may be augmented with a timer and system deactivation circuit component. Again, the timer might be set for longer intervals when an external power source is used (less aggressive) or for shorter periods when a battery power source is used (more aggressive). The settings may also be customized by a user, variables that a user might select may include the aggressiveness of the schedule, or other factors.

In another embodiment the electromagnetic radiation emitting display has a plurality of emission intensities and an ambient light detector. In one embodiment the ambient light detector varies screen emission intensities based on ambient light. This has the effect of saving power when the ambient light is low, while allowing images to be readily viewed in more intensely lit environments, such as rooms which enjoy direct access to sunlight.

In one embodiment the user interface include a flag button which allows a user to remove an image from image display sequence. This might be helpful when a user finds an image to be inappropriate, repetitive, not flattering, or for another reason.

In one embodiment of the present invention the system provides a user interface that includes a theme button which allows a user to select at least one theme for an image display sequence.

In one embodiment the system of claim 1, wherein images are displayed for varying lengths of time based theme. Alternatively, the selection could be a random selection, the degree of of ambient light detected with an ambient light detector the degree of motion detected with a motion detector, the time of day, day of the week, day of the month, day of the year, time of the year; and physiological state of a user in proximity to said system. In the case of ambient light the image may be selected to compliment a mood, in the case of time of the year, the holiday season may accompanied by holiday related pictures, ski season or days leading up to ski season may be accompanied by ski pictures. Similarly, selections may be made to coincide with the arrival of hunting and fishing seasons. In another embodiment a distributed database may be consulted to determine a river flow rate and display whitewater rafting pictures, or the database may by queried to determine snow accumulation and if snow levels are good then display skiing pictures. With the arrival of summertime pictures of boating trips, BBQs, and other summer activities could be placed in sequence. In another embodiment the middle of winter might be augmented by pictures of summer activities, as an encouragement that summer will come again.

In another embodiment the system allows a user to select or create files, the files allow the user place photos into of several files as the photos are displayed. A user could watch a slide show and as an image appears activate a control which puts the image into a file. For instance, there could be five buttons which would allow images to be classified into: favorites, family, fun, sequester (remove/file), or seasonal. In this manner the user would be able to classify images while watching the show. The system could continue to rotate a group of images until the user has classified each of the images into a folder. The user could always allow the algorithm to classify the images and then fine tune the classification, or otherwise reclassify an already classified image.

In one embodiment of the present invention the user interface includes an image duration display component, this component allows a user to select the duration that an image should be displayed. A variety of time could be offered as a preselcted list, and a user may also be able to select a customized time, including a customized time based on certain characteristics of an image, or a specific image. The user may also be able to select transition types. For instance a fades, wipes, or other image change styles, further, in other embodiments, a random selection may also be selected if desired.

In one embodiment of the present invention the system includes the ability to play sounds including at least one theme appropriate sounds. This could include musical clips which are appropriate to the theme, reading of inspirational material, recorded dialog, or other material. In another embodiment soothing sounds such as waves, birds, a brook, waterfall, or raindrops could be played. In another embodiment repetitive sounds, including the foregoing could be played, additionally content specific sounds could be played. Content specific sounds would be customized to an individual image, this could include dialog, music, or other sound, including sound recorded substantially contemporaneously with the image capture. In another embodiment the content specific sounds are selected based on, by way of non-limiting example image recognition, that is recognizing a specific image, object recognition, recognizing a person or other object in an image, facial recognition, color recognition, a lush green may precipitate the playing of the sounds of a rainforest. Similarly, color distribution may provide a more regular or frenetic pattern based on the distribution. In some case the sound will follow a theme but the sound will be varied according to the characteristics of the image. A busy image will be a busier sound while a highly uniform image might be accompanied by a more staid sequence.

In another embodiment the outer perimeter frame includes at least on light source, and usually a plurality of light sources. The light source or light sources are configured to receive a signal providing input on the dominant color of the image. The light sources may then be configured to emit light which is visible to a user (either directly or indirectly). In some case the light will be matched to the color in the image as it is broken by the frame, in other cases the light will be matched to the dominant color. In still other cases the light will be selected to complement the emits electromagnetic radiation in a region that is associated with the colors of the image being displayed.

In another embodiment the at least on light source includes at least one light emitting diode. In another embodiment the light source includes a plurality of light emitting diode modules, and each module includes at least on red, green, and blue light emitting diodes (LEDs). The LEDs may be individually addressable so that the modules can be modified to create a rich array of colors using variable intensities of the red, green, and blue LEDs. In another embodiment the LEDs are situated behind a diffusion layer, such a polycarbonate diffusion layer, so that the frame appears to have a homogeneous light source.

BRIEF DESCRIPTION OF THE DRAWINGS

The present invention provides its benefits across a broad spectrum of commerce. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION

Figure 1:
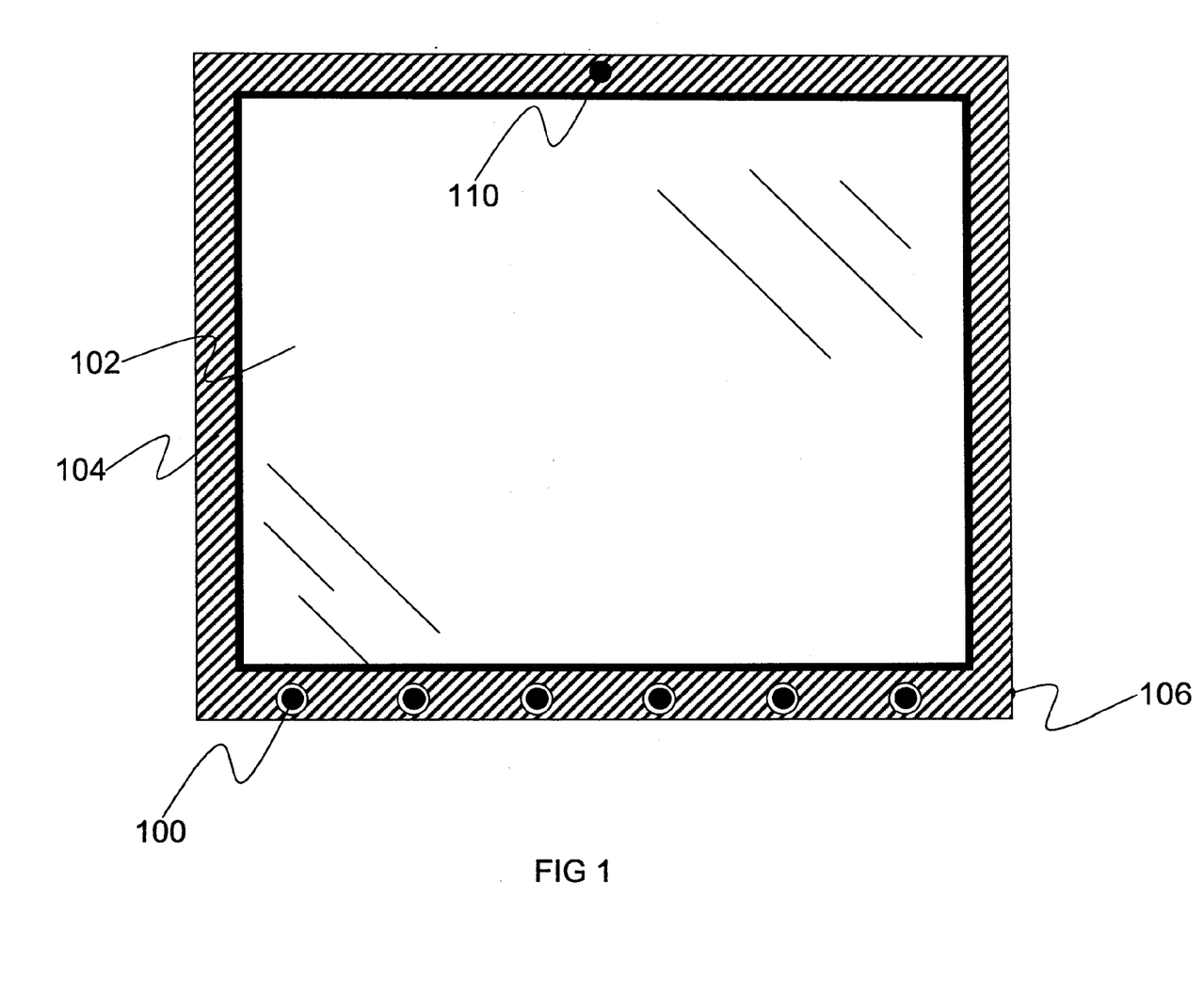
FIG. 1 is front view of a dynamically varying image display system.

Referring now to FIG. 1 wherein like reference numerals designate identical or corresponding parts throughout the several views. A dynamically varying image display system 100 includes an electromagnetic radiation emitting display 102, which is encompassed by an outer perimeter frame 104 that includes at least one user interface 108 and at least one system interface 106. A motion sensor 110 is configured to detect motion in the vicinity of the system 100. The system 100 further includes a flag button 112 which allows a user to remove an image from image display sequence, or otherwise control the frequency of the appearance of an image. The user interface 114 includes at least one theme button 114*a-c* which allows a user to select at least one theme for an image display sequence. FIG. 2A is a detailed view, in cross-section of the frame 104, and FIG. 2B is a cutaway of a plan view of the frame 104. It will be noted that LEDs 116 or other light sources are placed in a diffusive matrix 118. The obverse of the system 100 is provided at FIG. 3 where a system interface 106, in this case a Universal Serial Bus (USB) port is provided. Further, a support portion 122 is provided. Depending on the embodiment, the support portion 122 may be an element to facilitate the mounting of the system 100 to a wall, in this case the support portion 122*a* is an aperture, in another embodiment a support portion 122*b* may be a stand, in yet another embodiment the support portion 122*c* may be a mounting bracket. In some cases more than one such support portion 122 may be provided in a single system.

One embodiment of the present invention includes a dynamically varying image display system 100. The system includes an electromagnetic radiation emitting display 102, an outer perimeter frame 104 having a first shape. The shape can be square, rectangular, circular, oval or virtually any other shape including shapes having properties common to squares, rectangles, circles and ovals. It is to be noted that although many of the images may be substantially rectangular the display can take virtually any shape including a star, a fish, a car, etc. Of course in many cases the shape will be selected to optimally show an image. Thus, a star shaped frame may emphasize a central viewing portion while adding triangles to the peripheral. One embodiment of the present invention further includes at least one user interface 108. It is contemplated that this can take the form of a number of radio buttons, a touch screen, or, in some cases, other specific systems. It is contemplated that the system would not generally include a conventional integral keypad. One embodiment of the present invention further includes at least one system interface 106. The type of interface may include a wire interface such as a universal serial bus (USB) interface, a wireless interface, or other data transmission system.

The wireless upload system allows a user to emulate the system 100 on a remote computer. This feature allows a user to remotely add photos to a remote system. In this way a traveling salesperson could enjoy images sent over the Internet, or other medium such as a cell phone, and view these images. In operation, the images would appear when the system is turned on, providing a pleasant surprise for the user. The system 100 may include a cell phone signal receiver and have a port for a SIM card so that photos and sounds could be wirelessly transmitted from remote users using cellular phones. Of course the system 100 can also receive signals from an Internet connection, including a wireless Internet connection. The system 100 could also be used to convey emergency messages, or advertising, if the user chooses to allow such content. It is further envisioned that an internal memory, which is readily expandable would provide ample storage space for the thematically sorted images. In operation one embodiment of the present invention allows the system to be permanently mounted to a ceiling above a bed and images from loved ones, or the children and grandchildren of the user can be watched as the user lies in bed. Similarly, the system could be permanently mounted to a wall, and the images could be wirelessly (or otherwise) transmitted from a computer or other data repository, such as a WiFi connection to the system 100.

Figure 3:
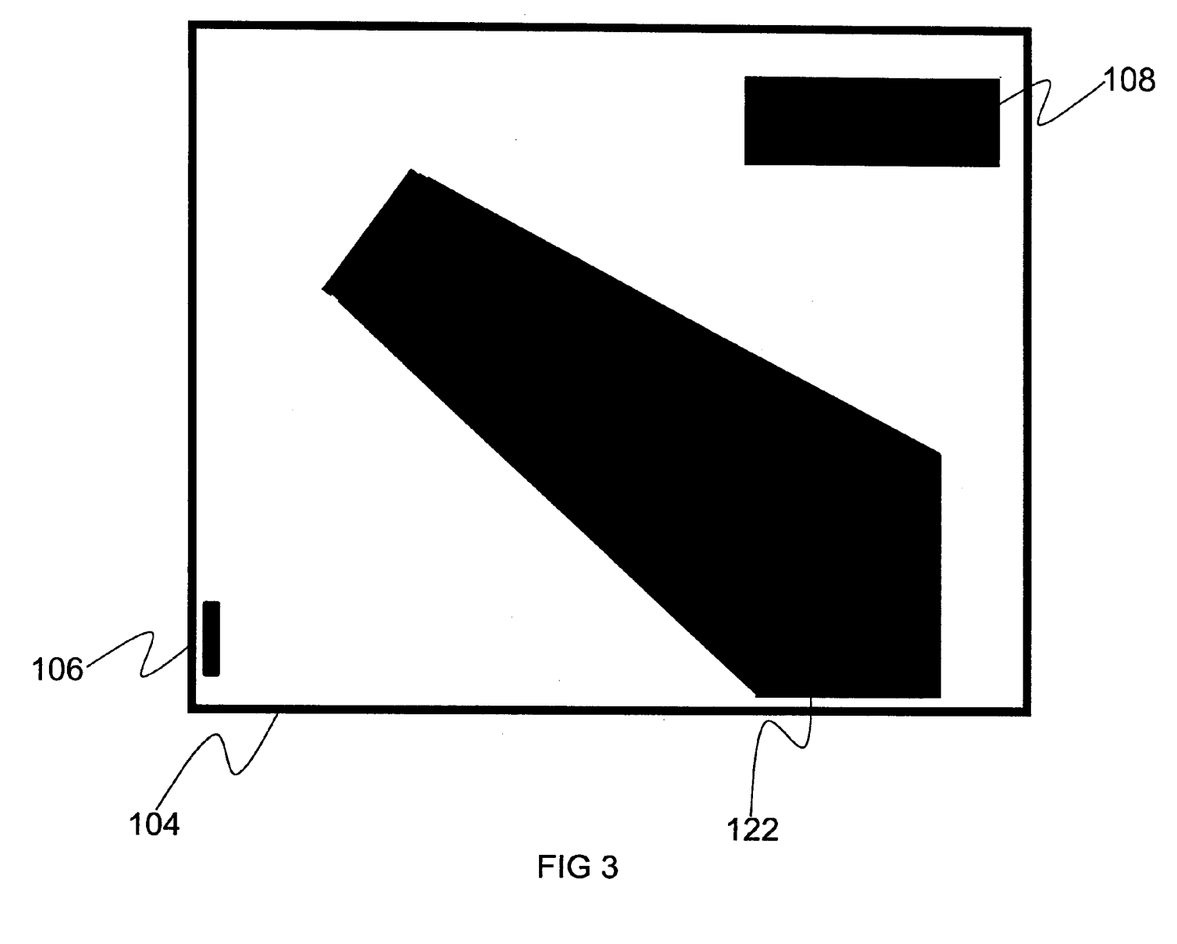
FIG. 3 is a side view of the dynamically varying image display system.
Figure 4:
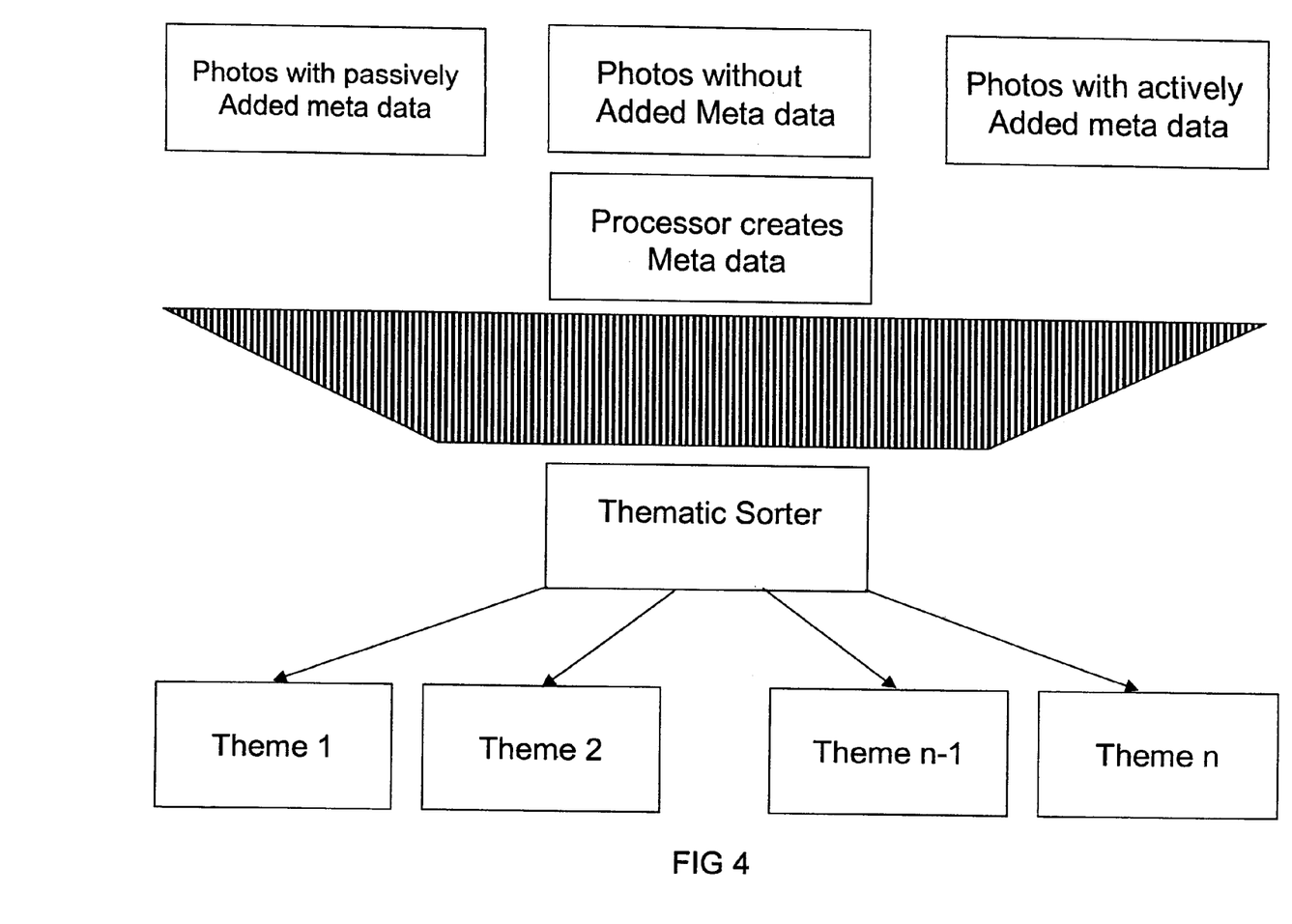
FIG. 4 is a flowchart detailing a thematic based sorting algorithm.

In some embodiments a power source 124 is contemplated, the exact form that the power supply might take is not critical for certain embodiments for the invention to perform. A battery, solar, and external power supply, or any combination of the foregoing is specifically contemplated.

Figure 5:
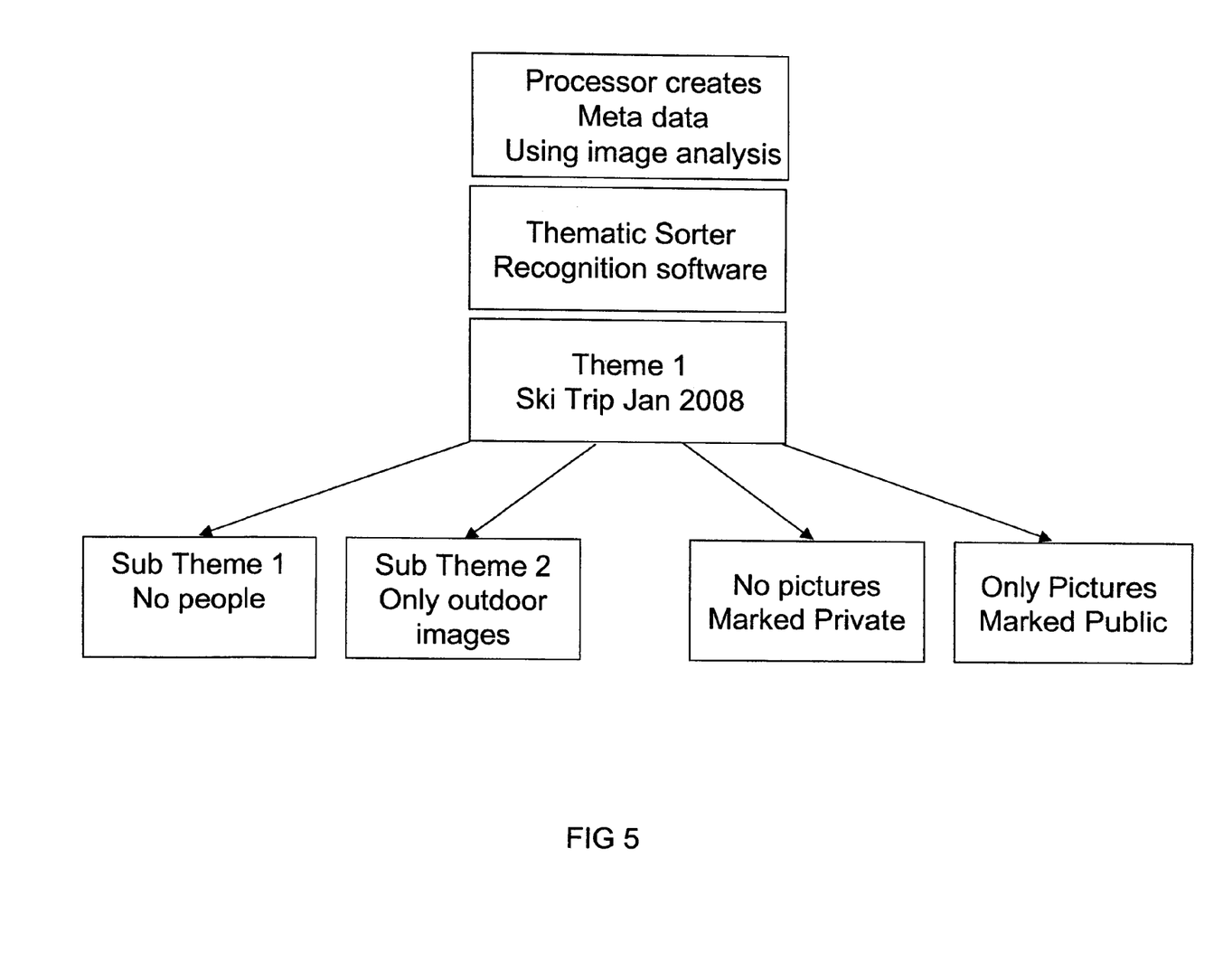
FIG. 5 is one example of the processor in operation.
Figure 6:
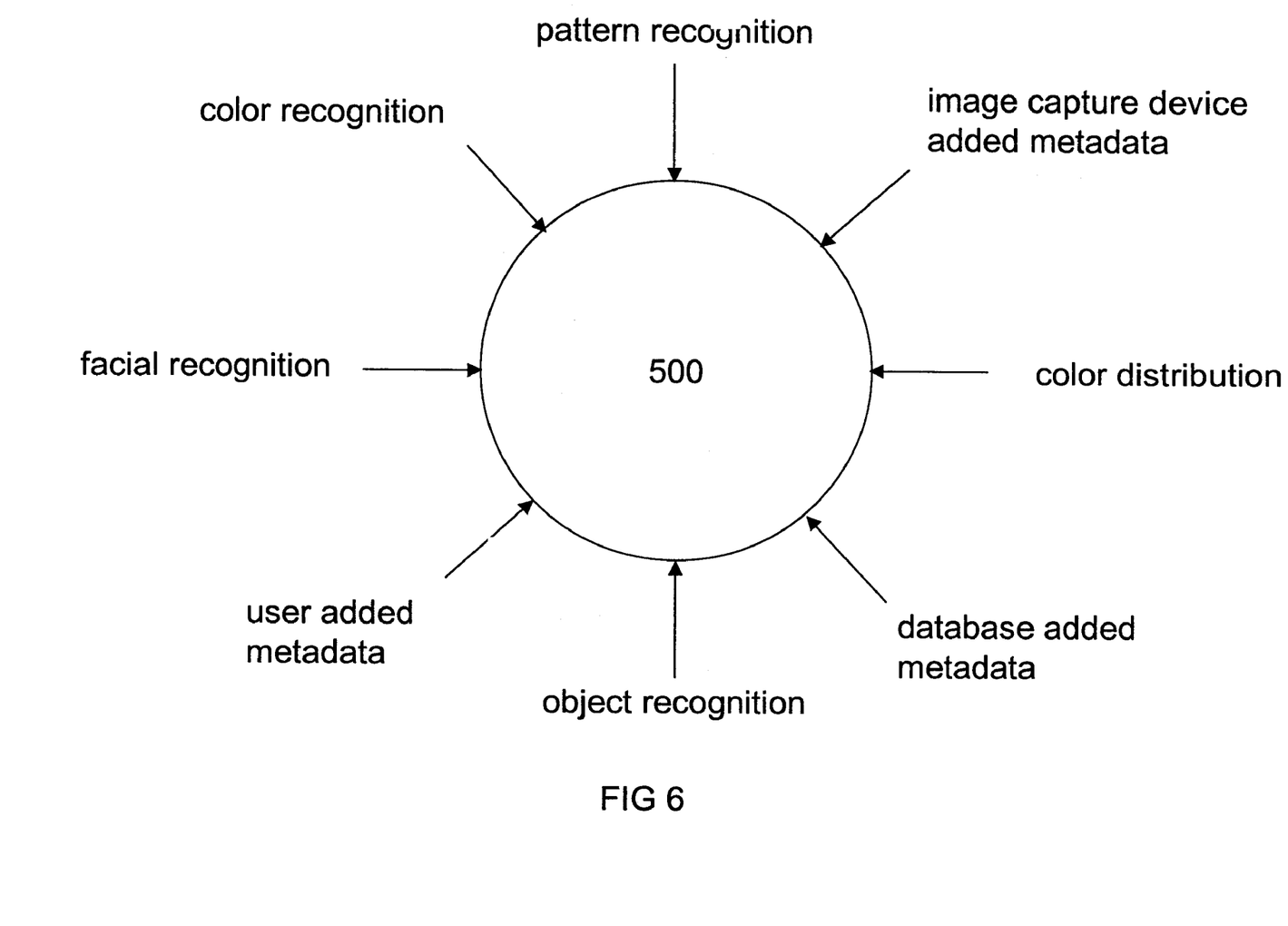
FIG. 6 processor that relies on at least one of the following: object recognition; facial recognition; color recognition; color distribution; user added metadata; image capture device added metadata; and database added metadata; and wherein the thematic based sorting algorithm creates an image display sequence.
Figure 7:
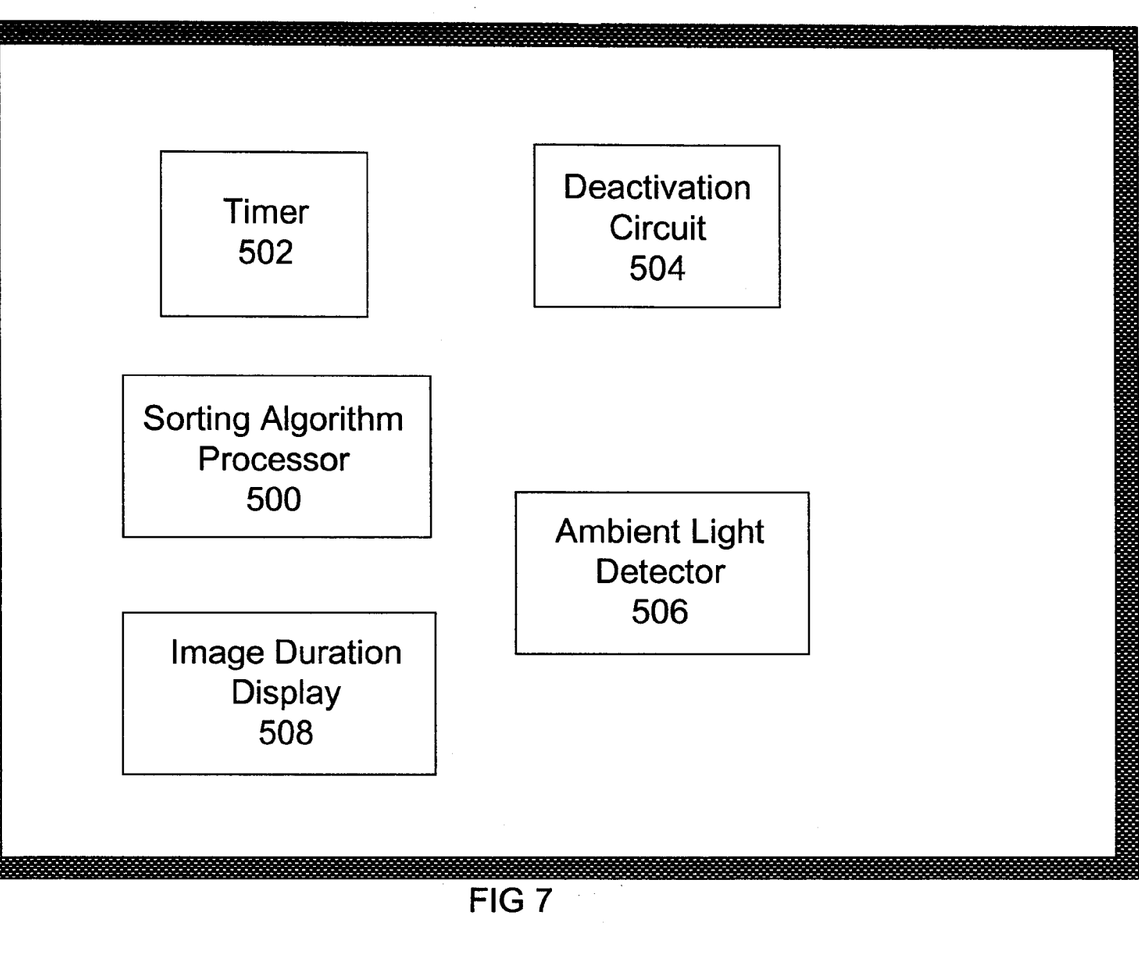
FIG. 7 is a block diagram showing possible components.
Figure 8:
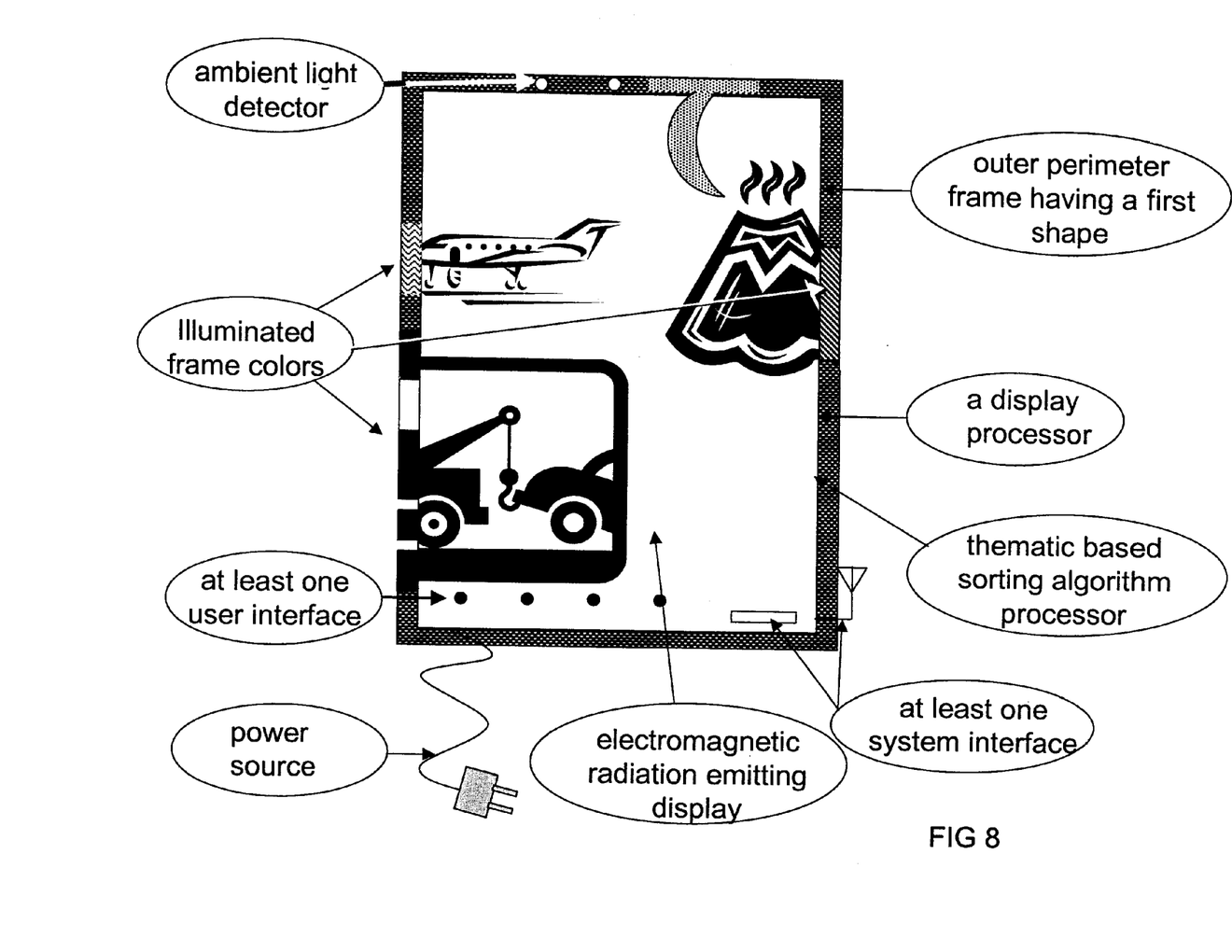
FIG. 8 is an embodiment with mood setting.

The image display system 100 will generally take a rectangular form, where rectangular is understood to include a perfect rectangle (aka a square). The system has a depth, width, and height. In one embodiment the relationship between the width and height of the system substantially follows the Fibonacci series. Further, the ratio of the product of the height and width is at least an order of magnitude larger than depth. In another embodiment the thematic based processor 500 sorting algorithm relies on at least one of: object recognition, facial recognition, color recognition, color distribution, user added metadata, image capture device added metadata, and database added metadata. In another embodiment the thematic based sorting algorithm creates an image display sequence.

In another embodiment the system 100 includes a motion sensor 110. The motion sensor 110 can take many forms, relevant is that it be able to sense the motion of a person in the presence of the system. The sensor 110 may also include a weight sensor activated when a user sits in a seat or weight is applied to an anti-static chair mat. In another embodiment the sensor 110, whatever form it takes, is operationally interfaced with a system activation component. This has the effect of shutting at least a portion of the system down when the user is no longer present. This feature would be especially desirable in a battery powered embodiment where energy savings are especially desirable. In one embodiment the system 100 can operate on battery or an external power source. In this case, the motion sensor might be disabled or the energy saving protocols might, less aggressively, be pursued. In another embodiment the motion sensor, may be augmented with a timer 502 and system deactivation circuit 504 component. Again, the timer b504 might be set for longer intervals when an external power source is used (less aggressive) or for shorter periods when a battery power source is used (more aggressive). The settings may also be customized by a user, variables that a user might select may include the aggressiveness of the schedule, or other factors.

In another embodiment the electromagnetic radiation emitting display 100 has a plurality of emission intensities and an ambient light detector 506. In one embodiment the ambient light detector 506 varies screen emission intensities based on ambient light. This has the effect of saving power when the ambient light is low, while allowing images to be readily viewed in more intensely lit environments, such as rooms which enjoy direct access to sunlight.

In one embodiment the user interface 108 include a flag button 112 which allows a user to remove an image from image display sequence. This may be helpful when a user finds an image to be inappropriate, repetitive, not flattering, or for another reason.

In one embodiment of the present invention the system provides a user interface 108 that includes a theme button 114 which allows a user to select at least one theme for an image display sequence.

The system may include an embodiment where the images are displayed for varying lengths of time based theme. For instance a nature theme might allow for longer displays while a road trip theme might have shorter display periods. Alternatively, the selection lengths of time could be a random selection. The length of the display could also be customized based on the degree of ambient light detected with an ambient light detector 506 the degree of motion detected with a motion detector 110, the time of day, day of the week, day of the month, day of the year, time of the year; and physiological state of a user in proximity to said system. Particularly, morning's might have a more rapid image changing sequence, while the afternoon may have a slower speed. The selection of images in the AM may also be higher energy images (rafting, biking, outdoor activities) while in the afternoon the selection may be more tranquil. Alternatively, the selection sequence could be reversed. Around holidays the selection sequence could be customized to display previous holidays. This could be done relying on metadata indicating the date range when pictures were taken. A Christmas vacation, or Thanksgiving Day metadata aligned images may be displayed preferentially during the relevant periods of the year. Bright summer related images may be added to selections during cold and dark winter months and ski trips, or snow capped peaks may be added to summertime selections. Again, metadata or image recognition could be used. Birthdays, anniversaries or days of consequence such as Confirmations or Bat Mitzvah or Bar Mitzvah. In another embodiment the ambient light of the room may result in the selection of appropriate images that are selected to compliment a mood. In the case of time of the year, the holiday season may accompanied by holiday related pictures, ski season or days leading up to ski season may be accompanied by ski pictures. Similarly, selections may be made to coincide with the arrival of hunting and fishing seasons. In another embodiment a distributed database may be consulted to determine a river flow rate and display whitewater rafting pictures, or the database may by queried to determine snow accumulation and if snow levels are good then display skiing pictures. With the arrival of summertime pictures of boating trips, BBQs, and other summer activities could be placed in sequence. In another embodiment the middle of winter might be augmented by pictures of summer activities, as an encouragement that summer will come again. In another embodiment seasonally appropriate music may optionally be added to augment the images. Such music could be added using a data carrier such as a disc or other media, or downloaded from a distributed database, such as the Internet.

In yet another embodiment of the present invention the user interface 108 includes an image duration display component 508, this component allows a user to select the duration that an image should be displayed. A variety of times could be offered as a pre-selected list, and a user may also be able to select a customized time, including a customized time based on certain characteristics of an image, or a specific image. Within the context of a specific range values with a minimum and maximum threshold and a distributed value could be used. Thus a 20-50 second upper/lower threshold and a 5 second increment could be used, thus values of 20, 25, 30, 35, 40, 45, and 50 could be used. Although not intended to be limited to the indicated times, it has been surprisingly discovered that times between 5 and 25 seconds with 2 second variable increments, i.e. 5, 7, 9, 11, 13, 15, 17, 19, 21, 23, and 25 seconds results in a significantly more appealing display. The algorithm may randomly select the duration or may select the duration based on the "busyness" of the image. It was discovered that a less busy image was subjectively more appealing with a longer duration and a relatively more busy image was more appealing with a shorter display. This is contrary to conventional logic which would suggest just the opposite, that a busier picture, with all its detail would ideally be displayed for a longer period of time. It was also noted that the busier images could be viewed with increased frequency without the user tiring of the image. Therefore, a less busy image may be accorded a lengthier display period but may appear with less frequency, while a busier image may appear for a shorter period, but might be displayed more often. It was also noted that, in a preferred embodiment, no image should be displayed more frequently than once in a given six to ten minute period. Reduced repetition will give the viewer the illusion that the repository of pictures is larger than it really is, thereby extending interest in the images. It was also surprisingly noted that when an advertisement was added to the mix of pictures it has the effect of projecting the product into the consciousness of the viewer, and leading the viewer to believe that the viewer actually had purchased the product advertised and enjoyed it during the period that is being illustrated in the pictures. For instance, a series of pictures of a Caribbean vacation, when augmented by an advertisement for a sensed product (smell or taste) will have the effect of helping the viewer to relive the experiences of the trip and instill a desire to purchase the advertised food. Advertisements could be added based on image content as determined by image recognition software, metadata etc. Advertisers may be willing to pay to insert their advertisements into the slide show.

In some embodiments the user or the system selects transition types. For instance a fades, wipes, or other image change styles, further, in other embodiments, a random selection may also be selected if desired.

In one embodiment of the present invention the system includes the ability to play sounds including at least one theme appropriate sounds. This could include musical clips, advertising jingles, or other media which are appropriate to the theme, reading of inspirational material, recorded dialog, or other material may also be provided. In another embodiment soothing sounds such as waves, birds, a brook, waterfall, or raindrops could be played. In another embodiment repetitive sounds, including the foregoing could be played, additionally content specific sounds could be played. Content specific sounds would be customized to an individual image, this could include dialog, music, or other sound, including sound recorded substantially contemporaneously with the image capture. In another embodiment the content specific sounds are selected based on, by way of non-limiting example image recognition, that is recognizing a specific image, object recognition, recognizing a person or other object in an image, facial recognition, color recognition, a lush green may precipitate the playing of the sounds of a rainforest. Similarly, color distribution may provide a more regular or frenetic pattern based on the distribution. In some case the sound will follow a theme but the sound will be varied according to the characteristics of the image. A busy image will be a busier sound while a highly uniform image might be accompanied by a more staid sequence.

Figure 2:
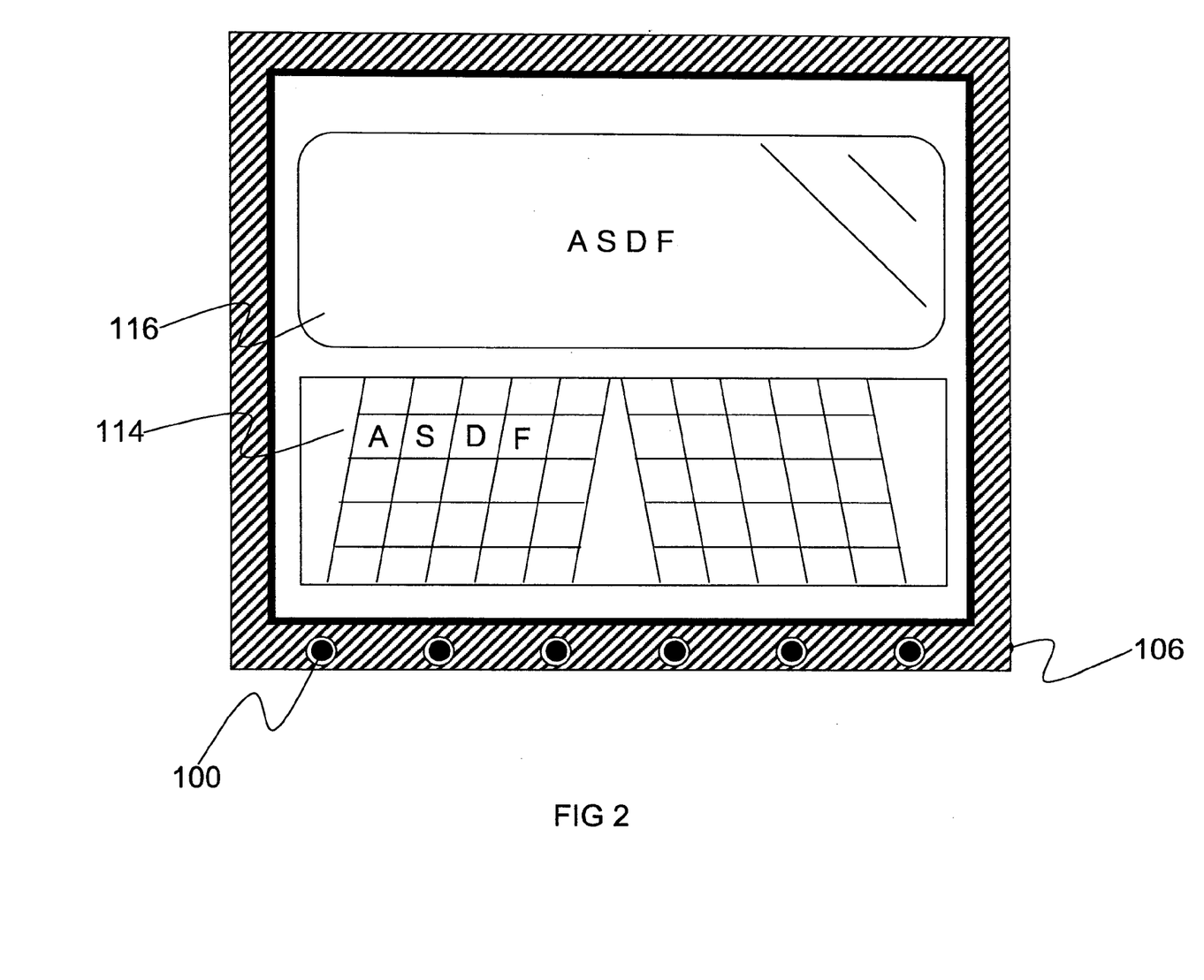
FIG. 2 is a detailed view, in cross-section of the frame includes at least on light source, and wherein said light source emits electromagnetic radiation in a region that is associated with the colors of the image being displayed.

In another embodiment the outer perimeter frame 104 includes at least on light source 116, and usually a plurality of light sources. The light source or light sources are configured to receive a signal providing input on the dominant color of the image. The light sources 104 may then be configured to emit light which is visible to a user (either directly or indirectly). In some cases the light will be matched to the color in the image as it is broken by the frame 104, in other cases the light will be matched to the dominant color in the image. In still other cases the light will be selected to complement the emitted electromagnetic radiation in a region that is associated with the colors of the image being displayed.

In another embodiment the at least on light source includes at least one light emitting diode. In another embodiment the light source includes a plurality of light emitting diode modules, and each module includes at least on red, green, and blue light emitting diodes (LEDs). The LEDs may be individually addressable so that the modules can be modified to create a rich array of colors using variable intensities of the red, green, and blue LEDs. In another embodiment the LEDs are situated behind a diffusion layer, such a polycarbonate diffusion layer, so that the frame appears to have a homogeneous light source.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

The invention claimed is:

1. A dynamically varying image display system comprising:
   an electromagnetic radiation emitting display;
   an outer perimeter frame having a first shape;
   at least one user interface;
   at least one system interface;
   a thematic based sorting algorithm processor;
   a display processor;
   a wireless upload element; and
   an internal memory element; the electromagnetic radiation display is configured to sequentially display a plurality of thematically classified images and the thematic based sorting algorithm processor relies on at least one of the following: object recognition of an object in an image; recognition of a person in an image; color recognition in an image; color distribution in an image; wherein the images were taken remotely in time or location;
   user added metadata; and metadata added by an image capture device and the thematic based sorting algorithm creates a thematic image display sequence, and the display processor is configured to sequentially display images in the sequence indicated by the thematic based sorting algorithm processor; and the electromagnetic radiation emitting display and a wireless upload component allows images to be wirelessly uploaded to the image storage system.

2. The system of claim 1, further including a motion sensor and system activation component.

3. The system of claim 2, further including a motion sensor, timer and system deactivation component.

4. The system of claim 3, wherein the electromagnetic radiation emitting display provides emission intensities in direct proportion to ambient light intensity based on input to the system processor from an ambient light detector.

5. The system of claim 1, wherein the user interface includes a flag button which allows a user to remove an image from image display sequence.

6. The system of claim 1, wherein the user interface include a theme button which allows a user to select at least one theme for an image display sequence.

7. The system of claim 1, wherein images are displayed for varying lengths of time based on at least one of the following: theme; random selection; degree of ambient light detected with an ambient light detector; degree of motion detected with a motion detector; time of day; day of the week; day of the month; day of the year and time of the year.

8. The system of claim 1, wherein the user interface includes an image duration display component.

9. The system of claim 1, wherein the user interface includes an image display transition component.

10. The system of claim 1, wherein the system includes the ability to play sounds including at least one of the following: theme appropriate sounds; soothing sounds; repetitive sounds; and content specific sounds.

11. The system of claim 10, wherein the content specific sounds are selected based on at least one of the following: image recognition object recognition; facial recognition; color recognition; and color distribution.

12. The system of claim 1, wherein the power source is self-contained and the display system is configured to display at least one of the following: emergency messages; and advertising.

13. The system of claim 1, wherein the outer perimeter frame includes at least on light source, and wherein said light source emits electromagnetic radiation in a region that is associated with the colors of the image being displayed.

14. The system of claim 13, wherein the at least on light source comprises at least one light emitting diode.

15. The system of claim 13, wherein the system includes a depth, width, and height and the relationship between the width and height of the system substantially follows the Fibonacci series, and the ratio of the product of the height and width is at least a factor of five larger than depth.

* * * * *